Jan. 5, 1971 J. KÖHLER 3,553,626

DUPLEX ROTARY TUNING VOLTAGE DIVIDER

Filed Dec. 10, 1968

Jnventor:

3,553,626
DUPLEX ROTARY TUNING VOLTAGE DIVIDER

Josef Köhler, Bad Neustadt, Saale, Germany, assignor to PREH Elektro-Feinmechanische Werke, Jakob Preh Nachf., Postfach, Bad Neustadt, Saale, Germany Filed Dec. 10, 1968, Ser. No. 782,661
Claims priority, application Germany, Dec. 16, 1967, 1,591,391
Int. Cl. H01c 5/00
U.S. Cl. 338—128 7 Claims

ABSTRACT OF THE DISCLOSURE

In a duplex rotary tuning voltage divider, two voltage dividers adapted to be adjustable indepenently of each other, each individual voltage divider having a resistance layer secured to opposite surfaces of a stationary support, each individual divider having a wiper secured to a carrier, said carriers of both said wipers being rotatably supported about a common axis but arranged on opposite sides of said support for said resistance layers, each of said wiper carriers being provided with an outer gear, and pinion means being adapted to selectively engage the gear of one of said wiper carriers to thereby rotate such carrier relative to its wiper and adjust the voltage division on the resistance layer engaged by such wiper.

The engagement of said pinion means with said gear of one said wiper carriers being effected either by means for shifting the pinion means along an axis of rotation parallelling the axis of rotation of said wiper carriers, or alternatively by pinions permanently engaging the gears of said wiper carriers and clutch means adapted to selectively couple one of said pinions at a time to an adjustment device.

The invention relates to a duplex voltage divider serving for the adjustment of the diode tuning voltage in a multiple range high frequency receiver having so-called duplex operation. This means a type of operation in which two tuning devices for different wave ranges are adjustable independently of each other by the same control device which, by the range switch of the apparatus, is coupled with the tuning device of the then switched-on range. Prior known rotary condensers conventionally serving as tuning device are operated, for istance by the drive of the medium or long wave rotary condenser on the one hand and the ultra-short wave rotary condenser on the other hand by operating a coupling system by the wave range switch by means of a common tuning knob.

The object of the present invention is to provide a duplex rotary voltage divider adapted for high frequency tuning with variable capacitance diodes in duplex operation, the divider having a simple design particularly suitable for the purpose of its use as well as a high mechanical stability and a high dependability in operation.

According to the present invention a duplex rotary tuning voltage divider has both its individual voltage dividers adjustable independently of each other by the same drive in providing the two exposed, coaxially supported wiper carriers with gear rims adapted to be coupled through a reduction gear with a common drive means by control means effecting axial displacement.

In known duplex rotary voltage dividers, having its individual dividers adjustable independently of each other by common drive, the drive is direct on the wiper shaft which is coupled with the then to be adjusted voltage divider. These known voltage dividers comprise neither a reduction gear nor do they permit in a simple manner to determine or to indicate the position of the wiper carrier enclosed in the housing. Both requirements constitute important premises for the proper functioning of the voltage divider as a tuning means and are, in accordance with the present invention, fulfilled in a suitable manner by simple means, with low costs and great dependability of operation.

By using the wiper carrier as driven element, the additional expense for the reduction gear is restricted to the relatively simply manufacturable pinion.

For indicating the then adjusted voltage, the most simple embodiment may have indices, e.g., channel numbers, provided on the outer margin of the wiper carrier, which indices are visible in a scale window. In accordance with a further embodiment of the invention, the outer surface of the wiper carrier is formed as a cable or rope pulley for the reception of a scale rope which transforms the rotary movement of the wipe into a linear movement of the hand or indicator on a linear scale.

In a first embodiment of the clutch between the wiper carriers and the common drive means, this clutch is formed as a wheel movably arranged on its shaft and provided on both sides with axial clutch teeth adapted to selectively engage, by the operation of the control means, the corresponding clutch rim of the pinion engaging the gear rim of the respective wiper carrier.

A second embodiment of the clutch has the drive element formed as a wheel in the shape of a double cone slidably mounted on its shaft, the double cone being adapted to be coupled selectively with the circularly arranged re-resiliently disengageable clutch tongues of the pinions, the latter being injection-molded of resilient plastics for frictional and/or positive coupling. Upon resilient coupling the adhesion friction force between the surface of the cone and the deflected clutch tongues is used, whereas for the formation of a positive coupling the surfaces of the cones are provided with ridges, which after a certain rotary movement, by the width of one tongue at a maximum, engage the spaces between the coupling tongues, A third embodiment of the clutch provides that the drive element is formed as a pinion with bevelled teeth on both sides, this element being selectively slidable by the control element into the engagement position with one of the two gear trims of the wiper carrier. In this particularly expense-saving embodiment, the reduction gear and the change clutch are combined into one device.

According to a further proposal of the invention, a fork-shaped gripper is used for switching the drive means, said gripper being axially parallelly slidably supported in a bearing or being pivotably supported on a pin, and said gripper engaging either a circumferential groove of the drive means or embracing a circumferential ridge of the same. The outwardly projecting end of the gripper is designed for cooperation with the device of the range switch triggering the change over.

The control element may, in accordance with a further embodiment of the present invention, be pretensioned by a spring, so that in the condition of rest the drive means is always coupled with one of the two voltage dividers. In this embodiment a control movement of the range switch is required only when the range coordinated to the other voltage divider is switched on.

The above described embodiments have the shaft of the drive means arranged vertically to the main plane of the voltage divider. For reasons of the spatial arrangement of the receiver it may be desirable that the drive shaft extends parallel to the plane of the voltage divider. For complying with this requirement, a further embodiment of the present invention has an intermediate gear with rectangularly arranged bevel gears on the bearing bracket of the drive means, by which the rotary movement is diverted by 90° C.

The invention and its details will be more fully understood from the embodiments described in the following, when read in connection with the accompanying drawings in which corresponding parts are provided with the same reference numerals.

Figure 1:
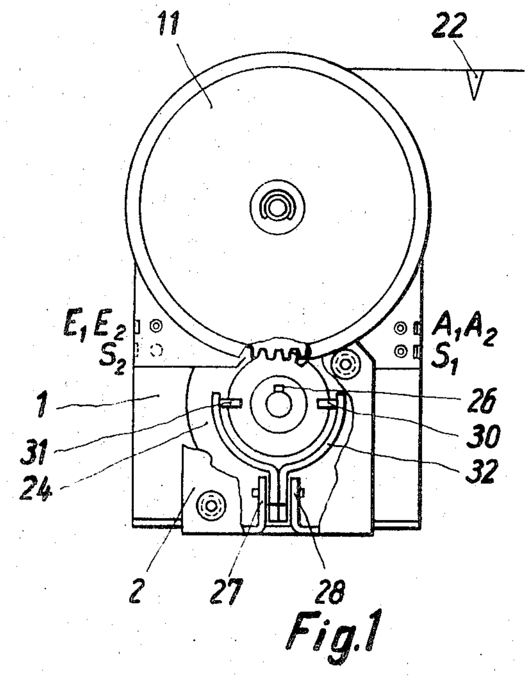
FIG. 1 shows a plan view (the lower half partly in section) of a duplex rotary tuning voltage divider.

The drawings show plates 3, 4 of insulating material on both sides of a support 1. Support 1 has a bearing 5 and is arranged on supporting bracket 2. Resistance elements 6, 7 are printed onto the insulating plates 3, 4 and provided with input and output terminals $A_1$, $B_1$ and $A_2$, $B_2$, respectively. Annular centre taps 8, 9 and their soldering connections $S_1$ and $S_2$, respectively, are provided on the insulating plates.

Spring carriers 11, 12 are supported in bearing bushing 5 by means of shaft 10. These spring carriers 11, 12 are injection-molded of synthetic material as shallow cups and secured in place by the lock washer 13. Wiper springs 14, 15 are thermoplastically secured on the inner surfaces of the carriers 11, 12. These springs have one arm each resting on the centre taps 8 and 9, respectively, and the second arm by carbon contacts 16 or 17, respectively, with pretension on the resistance elements 6 and 7, respectively. Gear rims 18, 19 are formed on the outer peripheries of both spring carriers 11, 12.

Figure 2:
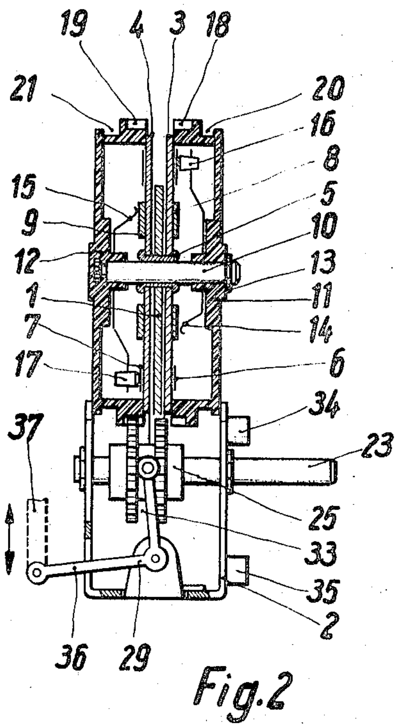
FIG. 2 shows a section along the middle axis of the voltage divider of FIG. 1.

In the embodiment illustrated in FIGS. 1 and 2, the teeth of the rims 18, 19 are pointed on the end surface facing support 1. The outer surfaces of the spring carriers 11, 12, adjoining the sides of the gear rims 18, 19 are formed as rope or pulleys 20, 21 serving for the reception of a rope for the symbolically shown scale hand 22.

A double pinion 25 is supported in bearing bracket 2 on shaft 23 in an opening 24 of support 1 and has its bore provided with groove 26 engaging a pin on shaft 23. The teeth of the double pinion are likewise tapered or pointed on the outer end surfaces.

A bell crank lever 29 is pivotally supported in tongues 27, 28 angled off from the bottom of supporting bracket 2 and engages by pins 30, 31 at its forked end 32 an annular groove 33 of double pinion 25. Pivot movement of bell crank lever 29, transmitted to its outer end 36 by coupling rod 37 (shown in dotted lines) from the frequency range switch (not shown), brings the double pinions 25 into engagement either with gear rim 18 or 19 and permits delicately sensitive adjustment of the then coupled voltage divider through the 1:3 reduction gear.

Two threaded bushings 34, 35 are riveted to supporting bracket 2 on the driving side for the purpose of securing the voltage divider.

Figure 3:
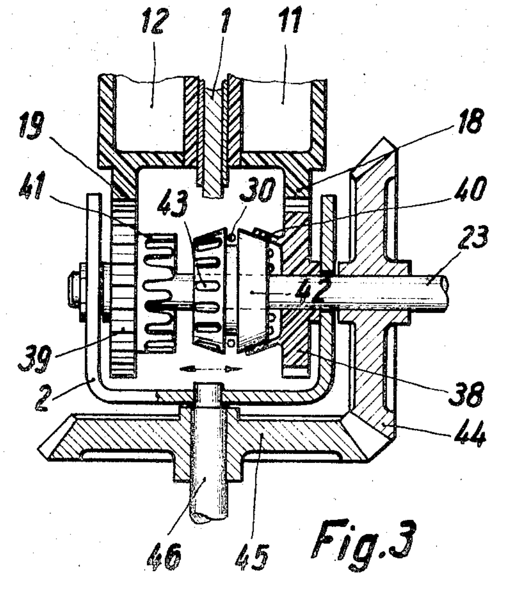
FIG. 3 shows a partial view and section of different coupling systems and an intermediate gear.

FIG. 3 shows a part of a duplex voltage divider in which each gear rim 18 or 19 is driven each by its own pinion 38 or 39, respectively, injection molded of plastics. Pinions 38, 39 are rotatably supported on shaft 23 and have on their inwardly turned side each a crownlike ring of elastically disengageable plastic tongues 40, 41. When double cone 42, slidably but non-rotatably supported on shaft 23, is displaced by fork pins 30, 31 in the direction of pinion 38, then the tongues 40 provide with the cone surface a friction clutch by which shaft 23 may drive gear rim 18. Positive coupling is achieved for pinion 39 since the appertaining cone surface is provided with ridges 43 which either at once or after a small rotation engage the recesses between the tongues 41. It will be understood that the different formations of the cone surfaces in effect may be considered as two different embodiments.

In FIG. 3 the drive is done through a rectangular intermediate gear having bevelled gears 44, 45 so that drive shaft 46 extends parallel to the plane of the voltage divider.

Figure 4:
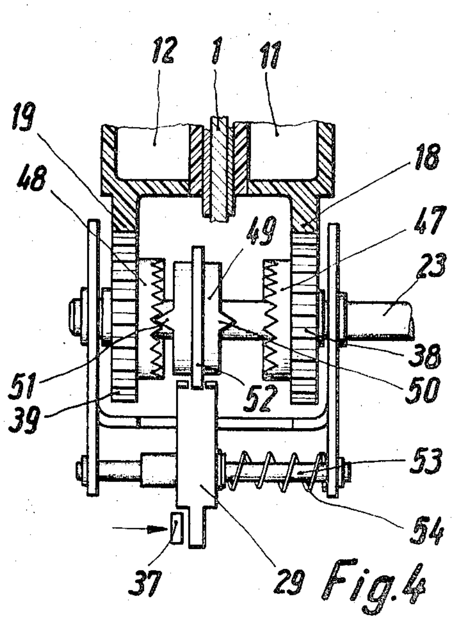
FIG. 4 shows part of a further coupling system.

FIG. 4 shows part of a duplex voltage divider having a tooth coupling. In this embodiment, the drive pinions 38, 39 are provided with rigid tooth crowns 47, 48. The driving element is here formed by a wheel 49 axially displaceably but nonrotatably supported on shaft 23 and provided on both sides with a coupling tooth 50, 51 each and with a circumferential annular collar 52. Engagement element 29 is axially displaceably supported on a side shaft 53 and biased by spring 54, the forked ends of which embrace the annular collar 52. Wheel 49 is held by spring 54 in the position of rest in engagement with the tooth crown 48, tooth crown 47 with wheel 38 is freely rotatable on shaft 23.

When a displacement force acts over coupling rod 37 on the engagement element 29 in the direction of the arrow, wheel 49 is displaced in overcoming the force of spring 54 until it engages the tooth crown 47. In this position spring carrier 11 on the driven side can be adjusted through gear rim 18.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. In a duplex rotary tuning voltage divider: two individual dividers being adjustable independently of each other, a common drive means for the adjustment of said individual dividers, one separate carrier for each individual voltage divider, each of said carriers being rigidly connected wth a contact wiper and provided with a gear rim and being freely coaxially rotatably supported on a common support, said common support having secured thereto a plate between said wiper carriers, said plate being provided on its opposite surfaces with resistance layers engaged by said wipers, a reduction gear engaging said gear rims of said wiper carriers, a common drive element adapted to drive said reduction gear, said reduction gear being adapted to be selectively coupled at one time with one only of said wiper carriers by axial displacement of an axially displaceable control element.

2. A voltage divider according to claim 1 having the outer surface of said wiper carriers adapted to serve as cable pulleys for scale cables.

3. In a voltage divider according to claim 1, pinions engaging said gear rims, said drive element consisting of a wheel axially displaceable on a shaft and provided on both sides with axially extending coupling teeth, said teeth being adapted to be brought selectively into engagement with matingly formed coupling crowns by means of a control element, said coupling crown being formed on said pinions.

4. In a voltage divider according to claim 1, a drive element consisting of a wheel in the form of a double-cone slidably movable on a shaft, said wheel being alternatively engageable with circularly arranged, resilient coupling tongues provided on drive pinions injection molded of resilient plastic, said pinions engaging said gear rims of said wiper carriers.

5. In a voltage divider according to claim 1, a pinion provided with inclined teeth on both sides, said pinion being slidable on a shaft by means of said control element so as to alternatively and selectively move it by axial displacement into engagement with one of said two gear rims of said wiper carriers.

6. In a voltage divider according to claim 1, having its said control element spring biased so as to effect in its position of rest continuous coupling of said drive element and reduction gear with one of said wiper carriers of said two individual voltage dividers.

7. In a voltage divider according to claim 1, having its drive element combined with an intermediate gear having bevelled gears so as to change the axis of rotation of a drive shaft arranged parallel to the plane of the said wiper carriers into an axis of rotation arranged vertically to the plane of the said wiper carriers.

References Cited

UNITED STATES PATENTS

| | | | |
|---|---|---|---|
| 2,620,418 | 12/1952 | Knowles, Jr., et al. | 338—128 |
| 2,866,052 | 12/1958 | Bourns et al. | 338—129 |
| 3,324,438 | 6/1967 | Wapner | 338—129 |
| 3,373,393 | 3/1968 | Havenstine et al. | 338—134 |

FOREIGN PATENTS

| | | | |
|---|---|---|---|
| 802,477 | 6/1936 | France | 338—130 |

THOMAS J. KOZMA, Primary Examiner